(12) United States Patent
Hofmann et al.

(10) Patent No.: US 12,091,265 B2
(45) Date of Patent: Sep. 17, 2024

(54) METHOD OF OPERATING A TRANSPORT SYSTEM AND TRANSPORT SYSTEM

(71) Applicant: Schneider Electric Industries SAS, Rueil-Malmaison (FR)

(72) Inventors: Steffen Hofmann, Steinfeld (DE); Jürgen Heid, Altertheim (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 18/144,921

(22) Filed: May 9, 2023

(65) Prior Publication Data
US 2023/0365000 A1  Nov. 16, 2023

(30) Foreign Application Priority Data
May 10, 2022  (EP) .................................... 22305693

(51) Int. Cl.
*B65G 54/02* (2006.01)
*B60L 13/03* (2006.01)
(Continued)

(52) U.S. Cl.
CPC .............. *B65G 54/02* (2013.01); *B60L 13/03* (2013.01); *B60L 15/005* (2013.01); *B61B 13/12* (2013.01);
(Continued)

(58) Field of Classification Search
CPC .... B60L 13/03; B60L 15/005; B60L 2240/12; B60L 2240/16; B61B 13/12; B65G 54/02
(Continued)

(56) References Cited

U.S. PATENT DOCUMENTS

2017/0217460 A1    8/2017  Huber et al.
2018/0282076 A1   10/2018  Huber
2021/0237981 A1    8/2021  Huber et al.

FOREIGN PATENT DOCUMENTS

DE    102016222806 B3    4/2018
EP        3196719 A2     7/2017
(Continued)

OTHER PUBLICATIONS

Extended European Search Report dated Nov. 9, 2022 for corresponding European Patent Application No. 22305693.8-1012, 17 pages.

*Primary Examiner* — Hung Q Nguyen
*Assistant Examiner* — Mark L. Greene
(74) *Attorney, Agent, or Firm* — Locke Lord LLP

(57) ABSTRACT

A method of operating a transport system, in particular a multi-carrier system, which comprises a plurality of linear motors, which are arranged in a row and have a guide track, and a plurality of transport elements that are movable along the guide track by means of the linear motors, has the following steps:
  generating a travel job for a first one of the transport elements for travelling along at least a part section of the guide track,
  generating a first movement profile of the first transport element for the travel job based on predetermined movement characteristic values,
  matching the first movement profile with a second movement profile of a second transport element directly in front of the first transport element and determining whether a predetermined minimum distance between the first transport element and the second transport element is fallen below during the execution of the travel job, (Continued)

Figure 1:
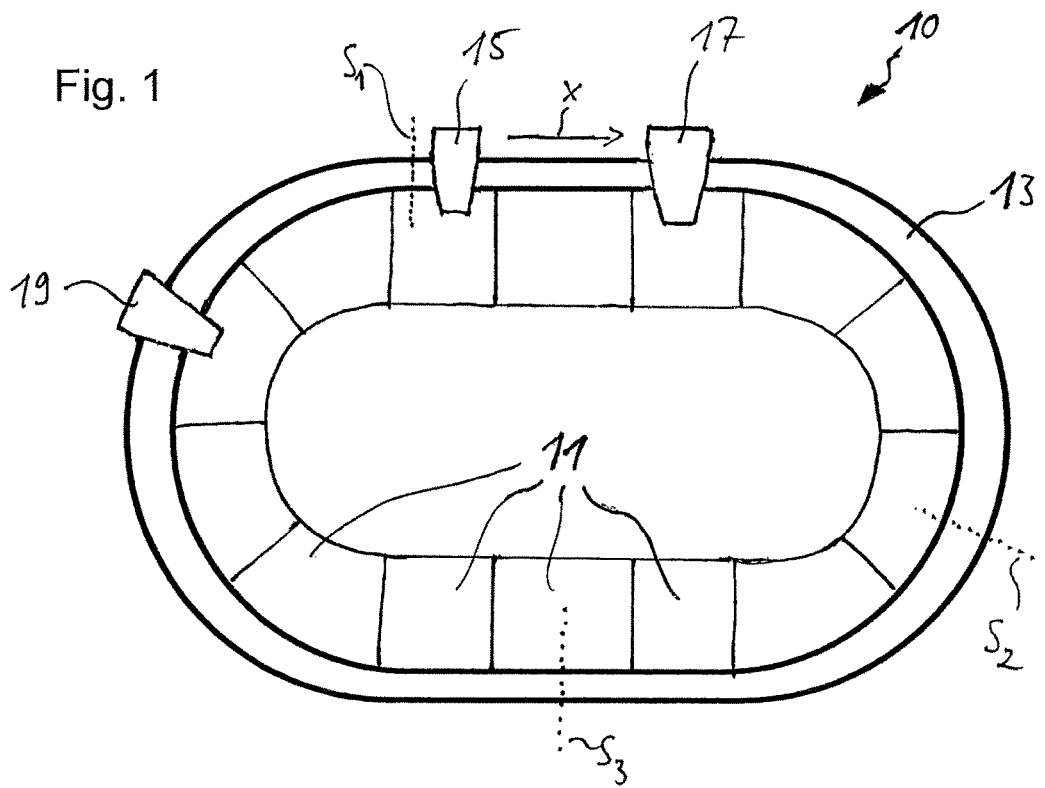

updating the first movement profile to maintain the minimum distance if it has been determined that the minimum distance is fallen below, and controlling the linear motors to move the first transport element in accordance with the first movement profile.

11 Claims, 3 Drawing Sheets

(51) Int. Cl.
 *B60L 15/00* (2006.01)
 *B61B 13/12* (2006.01)
(52) U.S. Cl.
 CPC ....... *B60L 2240/12* (2013.01); *B60L 2240/16* (2013.01)
(58) Field of Classification Search
 USPC ........................................................ 198/619
 See application file for complete search history.

(56) References Cited

FOREIGN PATENT DOCUMENTS

| | | |
|---|---|---|
| EP | 3202611 A1 | 8/2017 |
| EP | 3202612 A1 | 8/2017 |
| EP | 3575250 A1 | 12/2019 |
| EP | 3385803 B1 | 11/2020 |

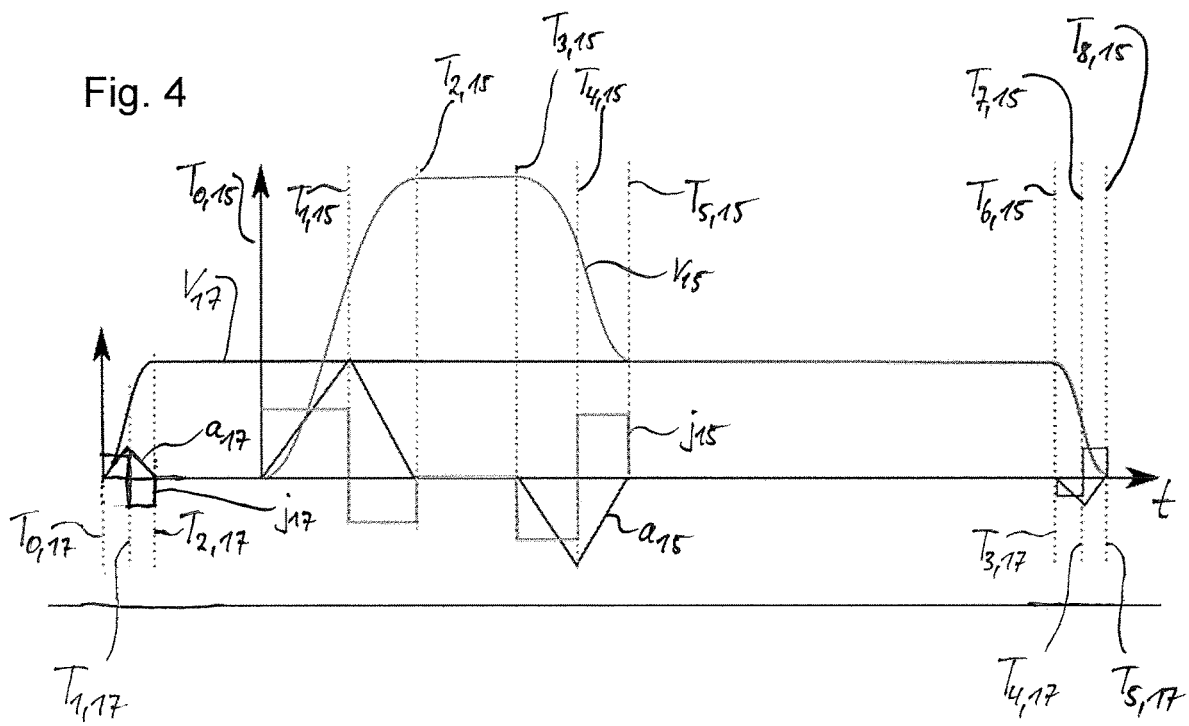

METHOD OF OPERATING A TRANSPORT SYSTEM AND TRANSPORT SYSTEM

The invention relates to a method of operating a transport system, in particular a multi-carrier system, that comprises a plurality of linear motors, which are arranged in a row and have a guide track, and a plurality of transport elements that are movable along the guide track by means of the linear motors.

One challenge in the operation of such a transport system is regularly the avoidance of collisions of the transport elements with one another, and indeed in particular when a large number of transport elements are moved along the guide track. To increase the capacity of the transport system, the transport elements should be moved along the guide track at as high a speed as possible. However, the risk of collisions is also increased at a high speed, on the other hand.

For example, transport elements can receive instructions from a control unit of the transport system to move to a specific target position along the guide track. However, if this target position is already blocked by one or more other transport elements, the transport element first has to be moved into a waiting position that is dependent on the number of transport elements that are in the target position, the required distance from the preceding transport element and, if applicable, the size of a product that is transported by the transport element. The position then has to be repeatedly calculated until the target position has been released by the other transport elements and the transport element can move up into the target position.

Furthermore, it can occur that preceding transport elements are moved more slowly. Then, the subsequent transport element has to be prevented from moving against the preceding transport element. Changes in the speed of the preceding transport element also have to be monitored in this respect to avoid a moving up.

Conventional solutions, as a rule, provide that a central control is used that usually cylindrically monitors the distances of the transport elements. If a collision between two transport elements is imminent, all the transport elements of the transport system are stopped to avoid this collision. Afterwards, a complex restart of all the transport elements is necessary during which the entire plant is out of operation for a certain time and production lines have to be stopped.

It is an object of the present invention to propose a method of operating a transport system and a transport system with an improved avoidance of collisions or of a falling below of distances.

This object is satisfied by the subject of the independent claims. Advantageous embodiments are the subject of the dependent claims and result from the description and the drawings.

The method in accordance with the invention serves for the operation of a transport system, in particular a multi-carrier system, that comprises a plurality of linear motors, which are arranged in a row and have a guide track, and a plurality of transport elements that are movable along the guide track by means of the linear motors. The method has the following steps:

generating a travel job for a first one of the transport elements for travelling along at least a part section of the guide track, generating a first movement profile of the first transport element for the travel job based on predetermined movement characteristic values, matching the first movement profile with a second movement profile of a second transport element directly in front of the first transport element and determining whether a predetermined minimum distance between the first transport element and the second transport element is fallen below during the execution of the travel job, updating the first movement profile to maintain the minimum distance if it has been determined that the minimum distance is fallen below, and controlling the linear motors to move the first transport element in accordance with the first movement profile.

The movement profile of transport elements usually includes at least the development of the position along the guide track over time so that it can be determined exactly at which point in time the transport element will be at which position along the part section. To be able to calculate the position development, the development of the speed, of the acceleration, and of the jerk over time are also considered. The rate of change of the acceleration in time is referred to as "jerk" in this respect. The operator of the transport system in particular has the possibility of predefining certain limit values. For example, limit values for speed, acceleration, and jerk can be predefined for each transport element and/or for different line sections. Thus, it can, for instance, be necessary to reduce the speed of a transport element in a curved region of the guide track in order to prevent the transport element from leaving the guide track or losing the transported load.

The second transport element is the transport element that is located along the guide track directly in front of the first transport element or travels directly in front of the first transport element, wherein "directly" means that no further transport element is located between the first and the second transport element or travels between them.

When matching the first movement profile with the second movement profile of the second transport element, it is first ensured that the two movement profiles are identical with respect to the time axis, i.e. that they are, if necessary, matched with respect to the time axis to be able to compare them with one another. The movement profile of the first transport element considered is then compared with the movement profile of the second transport element traveling ahead or located in the front and a development of the difference from the positions of the two transport elements over time is determined in order to determine whether the predetermined minimum distance is fallen below at any point in time when the travel job is being executed. In this respect, the predetermined minimum distance can in particular be defined by the operator of the transport system. If only a collision is to be prevented, the predetermined minimum distance can also be reduced to zero.

If it has been determined that the minimum distance is not fallen below, the transport element can simply execute its travel job. If, on the other hand, it is determined that the minimum distance is fallen below, the first movement profile is updated on the condition that the minimum distance is maintained. For example, it is possible to reduce the speed of the first transport element for the entire travel job or a part of the travel job for this purpose.

Finally, the linear motors are controlled to execute the travel job in accordance with the possibly updated first movement profile.

Thus, even before the setting off of the first transport element, it can be recognized whether a collision with the preceding transport element or a falling below of the minimum distance is to be expected. The movement of the transport element is therefore considered predictively, instead of having to calculate an approximate estimate repeatedly in a cyclical manner during the travel job. The invention also provides that the falling below of minimum distances is considered in a decentralized manner, wherein only one transport element at a time is considered together with the respective preceding transport element. This considerably simplifies the consideration of the entire system with respect to a central consideration of the entire system.

Each linear motor can in particular have six outer surfaces, namely an upper side, a lower side, an outer side, an inner side, and two side surfaces. In this respect, the side surfaces of adjacent linear motors are spaced apart from one another by a small expansion gap of approximately 0.1 mm to 0.2 mm or directly contact one another. The guide track for the transport elements can be formed at the outer side. The inner side is arranged in the region of an inner space of the transport system.

The transport system or the multi-carrier system can be peripherally formed so that the linear motors form a guide track closed in itself along which the transport element or the transport elements can theoretically be endlessly moved in the same direction. However, it is also possible for the linear motors to form an open guide track with a starting point and an end point. A plurality of stations can be arranged along the guide track, but they usually only exist virtually and are defined, for example, by a coordinate of the guide track. Such stations are possible starting points and target points for transport elements. For example, a transport element can receive a travel job that causes it to travel from one station to another station, which corresponds to a part section of the guide track. Actions can also be performed at the stations, such as the coupling or uncoupling of a certain number of consecutive transport elements or the waiting of a transport element until a certain number of transport elements are in the station or in the queue of this station.

The transport elements are in particular driven magnetically. For this purpose, the transport elements have one or more permanent magnets that are acted on by a driving force by means of a changing and/or wandering magnetic field that is generated by the linear motors. The driving force leads to a movement of the transport elements along the guide track. The transport elements can in particular be moved independently and separately from one another. Workpieces or products can thereby, for example, be transported along the guide track by means of the transport elements.

To hold the transport elements on the guide track, they are preferably attracted toward the guide track by means of an attractive force in a direction perpendicular to a direction of movement of the transport element. Thus, the attractive force also extends perpendicular to the driving force. The attractive force preferably extends from the guide track toward the linear motors or toward the coils of the linear motor. The attractive force is typically generated in that the magnet of the transport element is attracted by a magnetically conductive stator of the respective linear motor.

The transport element can also be designated as a carrier, a mover, or a runner; the linear motor can, in contrast, also be designated as a stator.

The first movement profile is preferably newly generated when it is determined that a generation event has occurred. The new generation of the movement profile can in particular also take place after the first transport element has already set off to execute the travel job. When the first movement profile is newly generated, the previously mentioned steps are repeated, i.e. the currently active first movement profile is matched against the currently active second movement profile that may have changed. If a falling below of the minimum distance is recognized, the first movement profile is updated again.

In general, any event that can influence the distance between the first transport element and the second transport element can serve as a generation event in this respect. The generation event can in particular be a change in the jerk of the second transport element. If a jerk of the second transport element is determined, this can indicate a deceleration of the second transport element, whereby the distance between the two transport elements would be reduced. Accordingly, on a change of the jerk, a check whether the minimum distance is still maintained is required. If the jerk change of the preceding transport element is selected as the generation event, this has the result that a change in the speed is recognized very quickly and the movement profile of the subsequent transport element can be newly generated almost in real time.

Furthermore, when the generation event occurs, a third movement profile of a third transport element directly behind the first transport element can furthermore be updated so that a moving up of the third transport element onto the first transport element also takes place. This can accordingly have an effect on any further subsequent transport elements.

In an advantageous embodiment, the matching of the first movement profile with the second movement profile comprises calculating a distance trajectory of a distance between the first transport element and the second transport element. The distance trajectory corresponds to the difference from the positions of the two transport elements as a development over the time axis. Thus, it can be determined when and whether the predetermined minimum distance is fallen below when the travel job is executed.

The speed of the first transport element can be reduced to the speed of the second transport element or less when the first movement profile is being updated. This can in particular happen from the point in time at which the first transport element approaches the second transport element up to the minimum distance. From this point in time onward, the first transport element therefore travels behind the second transport element at the same speed so that the minimum distance is maintained.

The movement characteristic values can comprise a maximum speed, a maximum acceleration, and/or an amount of the jerk and thus equally enable the predefining of the framework conditions or of the ideally achieved values, as long as no falling below of the minimum distance is considered.

The generation and/or updating of the movement profile in particular comprises determining time sections with a constant jerk and calculating a maximum actual acceleration and a maximum actual speed. The time period over which this jerk is applied can in particular be determined from the predefined amount of the jerk. Furthermore, the development of the acceleration, of the speed, and of the position can be determined therefrom by integration.

For example, the path distance of a travel job can first be divided into an acceleration section, a section with constant speed, and a deceleration section. The acceleration section, like the deceleration section, can then again be divided into a section with a constant positive jerk and a section with a constant negative jerk. Thus, a plurality of time sections with a constant jerk, whose respective duration can be determined based on the travel job and the characteristic movement values, result for the travel job.

The transport system in accordance with the invention is in particular a multi-carrier system and comprises a plurality of linear motors, which are arranged in a row and have a guide track, and a plurality of transport elements that can be moved along the guide track by means of the linear motors. The transport system is furthermore provided with a control unit that is configured to carry out the method described above.

In all other respects, the statements made about the method in accordance with the invention apply accordingly to the transport system in accordance with the invention.

Figure 2:
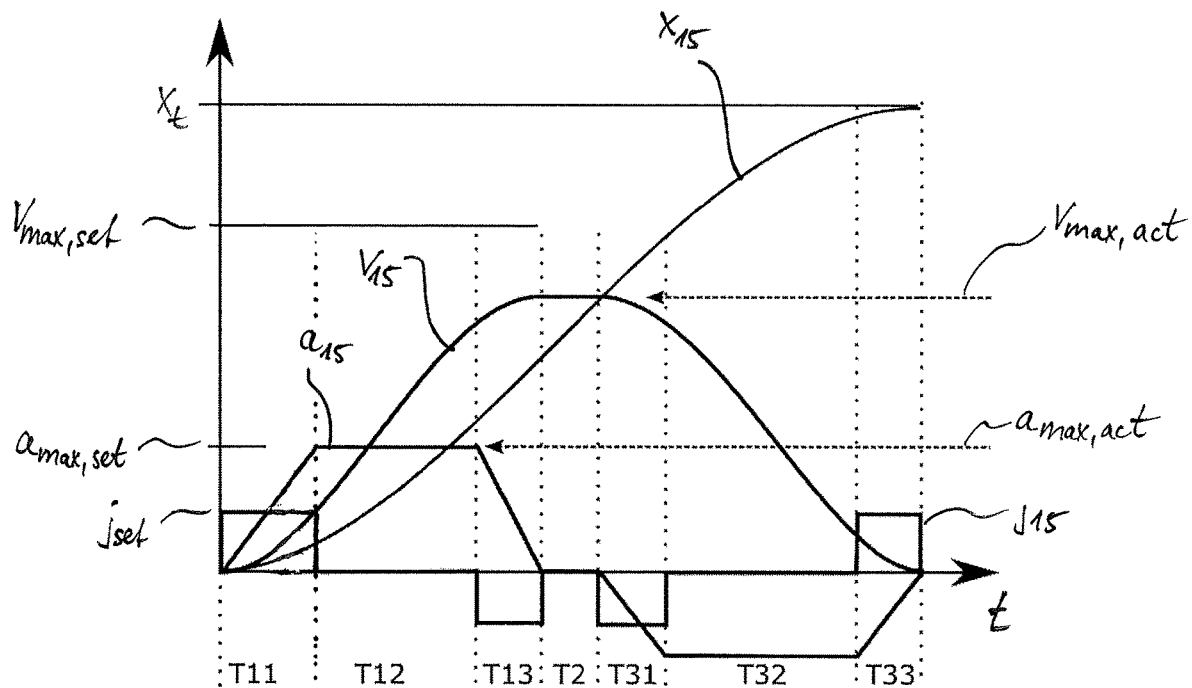
Figure 3:
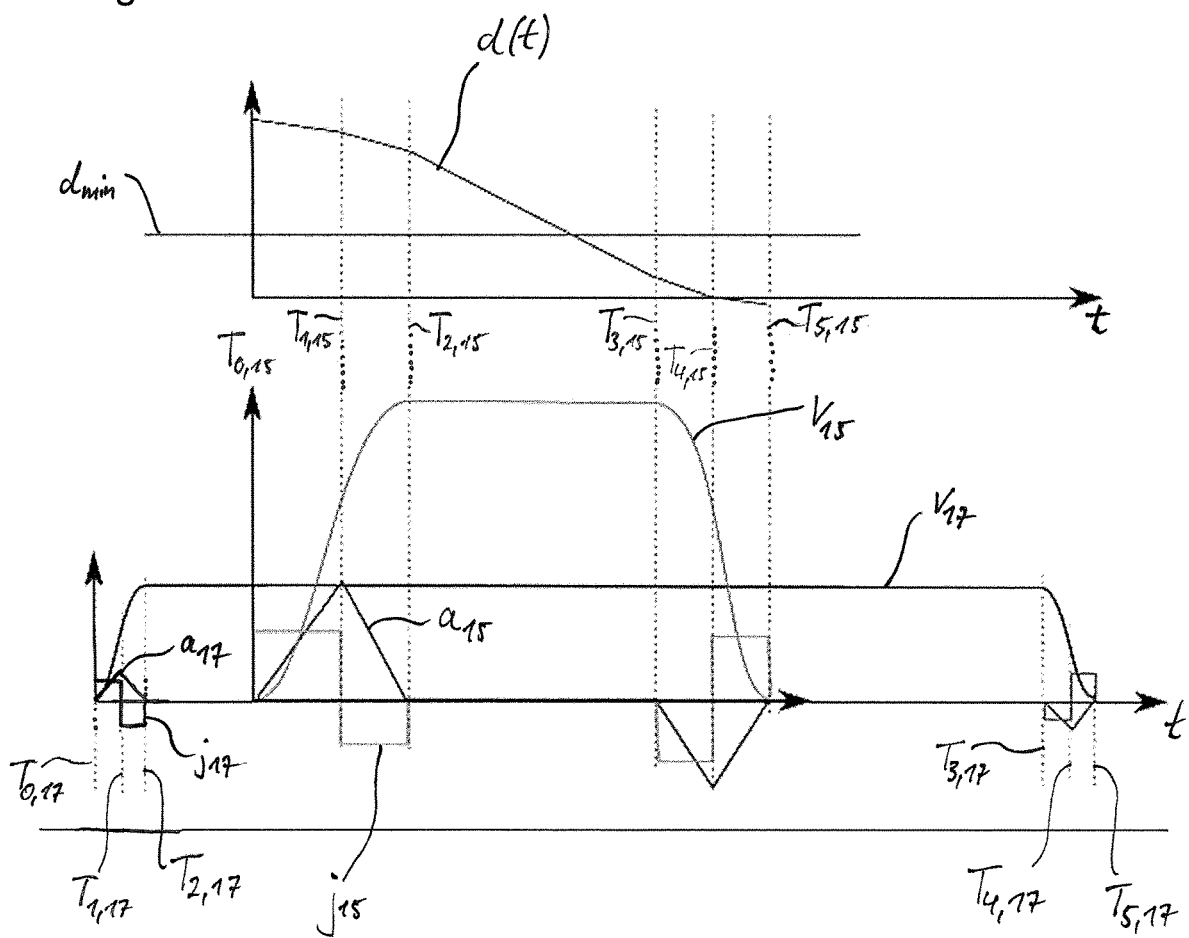

In the following, the invention will be described schematically and by way of example with reference to the drawings. It is shown therein:

FIG. 1 a plan view of a transport system configured as a multi-carrier system in accordance with an embodiment;

FIG. 2 a schematic representation of an exemplary movement development for a transport element;

FIG. 3 a representation of two superposed movement developments of two consecutive transport elements and an associated distance trajectory; and FIG. 4 a representation in accordance with FIG. 3, wherein the movement profile of the subsequent transport element has been updated.

FIG. 1 schematically shows a transport system 10 in a plan view that is configured as a multi-carrier system and that has a plurality of linear motors 11 that, in the present embodiment, are arranged in a closed row and form a closed guide track 13 for transport elements 15, 17, 19. For an illustrative description, only three transport elements 15, 17, 19 are shown in FIG. 1, namely a first transport element 15, a second transport element 17 that is located directly in front of the first transport element 15 in the direction of movement x, and a third transport element 19 that is located directly behind the first transport element 15 in the direction of movement x. "Directly" in this context is not to be understood as referring to a specific distance between the respective transport elements 15, 17, 19, but rather means that there is no further transport element between directly consecutive transport elements 15, 17, 19.

The transport elements 15, 17, 19 are magnetically driven by the linear motors 11. For this purpose, the transport elements 15, 17, 19 have one or more permanent magnets, not shown, that are acted on by a driving force by means of a changing and/or wandering magnetic field that is generated by the linear motors 11. The driving force leads to a movement of the transport elements 15, 17, 19 along the guide track 13. The transport elements 15, 17, 19 can in particular be moved independently and separately from one another. The linear motors 11 are controlled by a control unit, not shown, to drive the respective transport elements 15, 17, 19.

As can be seen from FIG. 1, a plurality of, in particular virtual, stations $S_1$, $S_2$, $S_3$ can be arranged along the guide track 13 and can, for example, be defined by their position in the direction of movement x along the guide track 13. At the stations, transport elements 15, 17, 19 can, for example, be combined or isolated again or can pick up a product for transport or deliver it again. For example, the transport elements 15, 17, 19 can receive an instruction from the control unit that causes the respective transport element to move from station $S_1$ to station $S_2$. Such instructions are also designated as a travel job.

As FIG. 1 shows, the first transport element 15 and the second transport element 17 move between station $S_1$ and station $S_2$, with the second transport element 17 moving ahead.

FIG. 2 shows a representation of an exemplary movement development for the first transport element 15 in which a movement from a starting position, for example a station, to a target position $x_t$, which may also be a station, is considered. The position development $x_{15}$ of the first transport element 15 is shown therein over a time axis, starts at the coordinate origin, and ends at the target position $x_t$. This movement is first divided into an acceleration phase in which the speed $v_{15}$ is increased up to a maximum actual speed $v_{max,act}$; a subsequent phase of constant speed; and a deceleration phase in which the speed $v_{15}$ is reduced up to a standstill in the target position $x_t$. The acceleration phase comprises a section with linearly increasing acceleration $a_{15}$, a subsequent section with constant positive acceleration $a_{15}$, wherein the constant acceleration $a_{15}$ in this section corresponds to a maximum actual acceleration $a_{max,act}$, and a part section with linearly decreasing acceleration $a_{15}$ until the acceleration $a_{15}$ is reduced to zero, i.e. the speed $v_{15}$ is kept constant. Accordingly, the deceleration phase comprises a section with linearly increasing deceleration $a_{15}$, a subsequent section with constant negative acceleration $a_{15}$ (deceleration), and a section with linearly decreasing deceleration $a_{15}$.

The development of the jerk $j_{15}$ as a time derivative of the acceleration $a_{15}$ is also shown in FIG. 2. As FIG. 2 shows, the jerk changes abruptly multiple times, namely at points at which the development of the acceleration $a_{15}$ is discontinuous, and then remains constant until the next discontinuity of the acceleration $a_{15}$. As shown, the acceleration phase is divided into three time sections T11, T12, T13 of constant jerk $j_{15}$ in each case. Similarly, the deceleration phase is divided into three time sections T31, T32, T33 of constant jerk $j_{15}$ in each case. The phase of constant speed therebetween corresponds to a time section T2 in which the jerk $j_{15}$ remains unchanged.

A maximum speed $v_{max,set}$, a maximum acceleration $a_{max,set}$, and an amount of the jerk $j_{set}$ are furthermore shown in FIG. 2. In the present embodiment, these values are predetermined movement characteristic values that can be predefined by the operator or user of the transport system. It is also conceivable that they are not predefined uniformly for an entire path, but rather for specific sections of the path. For example, it may be necessary to reduce the speed of a transport element in a curved region of the guide track to prevent the transport element from leaving the guide track or losing the transported load.

When a travel job is created for the first transport element 15, the method first provides generating a movement profile of the first transport element 15 for the travel job. In the present embodiment, this takes place based on the maximum speed $v_{max,set}$, the maximum acceleration $a_{max,set}$, the amount of the jerk $j_{set}$, and the target position $x_t$ as predetermined movement characteristic values. In particular, the development of the position $x_{15}$ over time is part of the movement profile. As FIG. 2 shows, the maximum actually achieved speed $v_{max,act}$ in the present example is smaller than the corresponding predefined maximum value, which can, for instance, occur if the distance to be covered is not sufficient to accelerate the maximum speed $v_{max,set}$. In this example, the maximum actually achieved acceleration $a_{max,act}$ is equal to the maximum predefined acceleration $a_{max,set}$.

Furthermore, the previously described time sections T11, T12, . . . , T33 with a constant jerk are determined from the predetermined movement characteristic values and, if necessary, a maximum actual acceleration $a_{max,act}$ and a maximum actual speed $v_{max,act}$ are calculated.

FIG. 3 shows in the lower diagram that two movement developments of two consecutive transport elements 15, 17 are superposed, wherein the speed $v_{15}$, $v_{17}$, the acceleration $a_{15}$, $a_{17}$, and the jerk $j_{15}$, $j_{17}$ of the two transport elements 15, 17 are shown as a development over the time axis in each case. The positions of the two transport elements 15, 17 are not shown separately, but the upper diagram in FIG. 3 rather shows a distance trajectory d(t) that corresponds to the time development of the distance between the two transport elements 15, 17, i.e. the difference of the position developments.

FIG. 3 illustrates an example in which the second transport element 17 first starts with the traveling of a travel job at a point in time $T_{0,17}$. At a point in time $T_{0,15}$, the first transport element 15 is also to start with the traveling of a travel job along the same part section of a guide track 13. Accordingly, the two movement developments are shown offset on the time axis, i.e. adapted with respect to the time axis, to be able to compare them. Since the second transport element 17 sets off first, while the first transport element 15 is not yet moving on the part section, a distance d(t) is initially built up between the transport elements 15, 17 that is in each case calculated at the points in time $T_{0,15} \ldots T_{5,15}$, wherein a linear development of the distance d(t) is taken as a basis between consecutive points in time. FIG. 3 shows, however, that the speed $v_{15}$ of the subsequent transport element 15 is higher than the speed $v_{17}$ of the preceding transport element 17 so that the distance d(t) is successively reduced and would fall below a minimum distance $d_{min}$, for example predetermined by an operator or user of the transport system 10, between the points in time $T_{2,15}$ and $T_{3,15}$ that each mark a point in time with a changed jerk $j_{15}$ of the first transport element 15. Based on this comparison, it is thus determined that the predetermined minimum distance $d_{min}$ between the transport elements 15, 17 would be fallen below during the execution of the travel job of the first transport element 15.

Accordingly, the movement profile of the first transport element 15 for the travel job first has to be adapted. For this purpose, the movement profile is updated such that the minimum distance $d_{min}$ is maintained during the travel job of the first transport element 15. In the present example, this takes place by reducing the speed $v_{15}$ of the first transport element 15 to the speed $v_{17}$ of the second transport element 17, as FIG. 4 clearly shows. As stated above, in the movement development in accordance with FIG. 3, the minimum distance $d_{min}$ would be fallen below between the points in time $T_{2,15}$ and $T_{3,15}$. Accordingly, the movement sequence of the subsequent first transport element 15 in FIG. 4 remains unchanged from FIG. 3 from the point in time $T_{0,15}$ of the setting off up to the point in time $T_{2,15}$. The point in time $T_{3,15}$ at which the first transport element 15 decelerates and the jerk $j_{15}$ changes accordingly is advanced in FIG. 4 compared to FIG. 3, i.e. the movement of the first transport element 15 is decelerated earlier. Furthermore, FIG. 4 shows that after a deceleration phase between $T_{3,15}$ and $T_{5,15}$, the speed $v_{15}$ of the first transport element 15 corresponds to the speed $v_{17}$ of the second transport element 17 so that the minimum distance $d_{min}$ is not fallen below.

After a falling below of the minimum distance $d_{min}$ is avoided based on the updated movement profile, the linear motors 11 are controlled by the control unit to move the first transport element 15 in accordance with the updated first movement profile.

Thus, a possible falling below of the minimum distance $d_{min}$ is already recognized before the start of the travel job and the movement profile of the first transport element 15 is adapted to avoid the falling below. The distance from the preceding transport element 17 is thereby controlled predictively rather than adaptively. Delays due to response times are thereby in particular also avoided. Rather, consecutive transport elements can accelerate or decelerate simultaneously and to the same degree so that an accordion effect is avoided. An additional collision prevention, for example in the sense of a switching off of all the transport elements, is obsolete.

In addition, the movement profile of the first transport element 15 can be newly generated or updated in the same manner as described above when it is determined that a generation event has occurred. For example, it is possible to detect a change in the jerk $j_{17}$ of the second transport element 17 as a generation event. This change can, for instance, indicate a deceleration of the second transport element 17. Furthermore, when the generation event occurs, a movement profile of the third transport element 19 directly behind the first transport element 15 can likewise be updated.

REFERENCE NUMERAL LIST 10 transport system
11 linear motor
13 guide track
15 first transport element
17 second transport element
19 third transport element
$a_{15}$ acceleration of the first transport element
$a_{17}$ acceleration of the second transport element
$a_{max,act}$ maximum actual acceleration
$a_{max,set}$ maximum acceleration
d(t) distance trajectory
$d_{min}$ minimum distance
$j_{15}$ jerk of the first transport element
$j_{17}$ jerk of the second transport element
$j_{set}$ amount of the jerk
$S_1$ station
$S_2$ station
$S_3$ station
T time section
$v_{15}$ speed of the first transport element
$v_{17}$ speed of the second transport element
$V_{max,act}$ maximum actual speed
$V_{max,set}$ maximum speed
x direction of movement
$x_{15}$ position of the first transport element
$x_t$ target position

The invention claimed is:

1. A method of operating a transport system that comprises a plurality of linear motors, which are arranged in a row and have a guide track, and a plurality of transport elements that are movable along the guide track by means of the linear motors, wherein the method comprises:
  generating a travel job for a first one of the transport elements for travelling along at least a part section of the guide track,
  generating a first movement profile of the first transport element for the travel job based on predetermined movement characteristic values,
  matching the first movement profile with a second movement profile of a second transport element directly in front of the first transport element and determining whether a predetermined minimum distance between the first transport element and the second transport element is fallen below during execution of the travel job, updating the first movement profile to maintain the minimum distance if it has been determined that the minimum distance is fallen below, and controlling the linear motors to move the first transport element in accordance with the first movement profile, wherein the first movement profile is newly generated when it is determined that a generation event has occurred, and wherein the generation event is a change in jerk of the second transport element.

2. The method in accordance with claim 1, wherein, when the generation event occurs, a third movement profile of a third transport element directly behind the first transport element is furthermore updated.

3. The method in accordance with claim 1, wherein the matching of the first movement profile with the second movement profile comprises calculating a distance trajectory of a distance between the first transport element and the second transport element.

4. The method in accordance with claim 1, wherein the speed of the first transport element is reduced to the speed of the second transport element or less when the first movement profile is being updated.

5. The method in accordance with claim 1, wherein the movement characteristic values comprise a maximum speed, a maximum acceleration, and/or an amount of jerk.

6. The method in accordance with claim 1, wherein the generation and/or the updating of the first movement profile comprises determining time sections with a constant jerk and calculating a maximum actual acceleration and a maximum actual speed.

7. The method in accordance with claim 1, wherein the transport system is a multi-carrier system.

8. A transport system that comprises a plurality of linear motors, which are arranged in a row and have a guide track, and a plurality of transport elements that can be moved along the guide track by means of the linear motors, further comprising a control unit that is configured to carry out a method of operating a transport system that comprises a plurality of linear motors, which are arranged in a row and have a guide track, and a plurality of transport elements that are movable along the guide track by means of the linear motors, wherein the method comprises:

generating a travel job for a first one of the transport elements for travelling along at least a part section of the guide track, generating a first movement profile of the first transport element for the travel job based on predetermined movement characteristic values, matching the first movement profile with a second movement profile of a second transport element directly in front of the first transport element and determining whether a predetermined minimum distance between the first transport element and the second transport element is fallen below during execution of the travel job, updating the first movement profile to maintain the minimum distance if it has been determined that the minimum distance is fallen below, and controlling the linear motors to move the first transport element in accordance with the first movement profile, wherein the first movement profile is newly generated when it is determined that a generation event has occurred, and wherein the generation event is a change in jerk of the second transport element.

9. The transport system in accordance with claim 8 wherein the transport system is a multi-carrier system.

10. A method of operating a transport system that comprises a plurality of linear motors, which are arranged in a row and have a guide track, and a plurality of transport elements that are movable along the guide track by means of the linear motors, wherein the method comprises:

generating a travel job for a first one of the transport elements for travelling along at least a part section of the guide track, generating a first movement profile of the first transport element for the travel job based on predetermined movement characteristic values, matching the first movement profile with a second movement profile of a second transport element directly in front of the first transport element and determining whether a predetermined minimum distance between the first transport element and the second transport element is fallen below during execution of the travel job, updating the first movement profile to maintain the minimum distance if it has been determined that the minimum distance is fallen below, and controlling the linear motors to move the first transport element in accordance with the first movement profile, wherein the matching of the first movement profile with the second movement profile comprises calculating a distance trajectory of a distance between the first transport element and the second transport element.

11. A method of operating a transport system that comprises a plurality of linear motors, which are arranged in a row and have a guide track, and a plurality of transport elements that are movable along the guide track by means of the linear motors, wherein the method comprises:

generating a travel job for a first one of the transport elements for travelling along at least a part section of the guide track, generating a first movement profile of the first transport element for the travel job based on predetermined movement characteristic values, matching the first movement profile with a second movement profile of a second transport element directly in front of the first transport element and determining whether a predetermined minimum distance between the first transport element and the second transport element is fallen below during execution of the travel job, updating the first movement profile to maintain the minimum distance if it has been determined that the minimum distance is fallen below, and controlling the linear motors to move the first transport element in accordance with the first movement profile, wherein the generation and/or the updating of the first movement profile comprises determining time sections with a constant jerk and calculating a maximum actual acceleration and a maximum actual speed.

* * * * *